United States Patent
Shuler et al.

(10) Patent No.: US 9,742,855 B2
(45) Date of Patent: Aug. 22, 2017

(54) HYBRID TAG MATCHING

(71) Applicant: Mellanox Technologies Ltd., Yokneam (IL)

(72) Inventors: Shahaf Shuler, Karkom (IL); Noam Bloch, Bat Shlomo (IL); Ofer Hayut, Kvutzat Yavne (IL); Richard Graham, Knoxville, TN (US); Ariel Shahar, Jerusalem (IL); Yossef Itigin, Ashdod (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 192 days.

(21) Appl. No.: 14/834,443

(22) Filed: Aug. 25, 2015

(65) Prior Publication Data
US 2016/0072906 A1    Mar. 10, 2016

Related U.S. Application Data

(60) Provisional application No. 62/045,606, filed on Sep. 4, 2014.

(51) Int. Cl.
*H04L 29/08* (2006.01)
*H04L 29/06* (2006.01)
*H04L 12/861* (2013.01)

(52) U.S. Cl.
CPC .......... *H04L 67/26* (2013.01); *H04L 49/9068* (2013.01); *H04L 67/10* (2013.01);
(Continued)

(58) Field of Classification Search
CPC ................. H04L 67/10; H04L 67/1093; H04L 67/1097; H04L 67/26; H04L 69/06; H04L 49/9068
See application file for complete search history.

(56) References Cited

U.S. PATENT DOCUMENTS 7,617,376 B2 * 11/2009 Chadalapaka .......... H04L 67/00
                                                              711/153
7,735,099 B1 *  6/2010 Micalizzi, Jr. .......... G06F 9/544
                                                              709/212

(Continued)

OTHER PUBLICATIONS

Rashti et al., "Improving Communication Progress and Overlap in MPI Rendezvous Protocol over RDMA-enabled Interconnects", 22nd International Symposium on High Performance Computing Systems and Applications (HPCS), pp. 95-101, Jun. 9-11, 2008.

(Continued)

*Primary Examiner* — Patrice Winder
(74) *Attorney, Agent, or Firm* — D.Kliger IP Services Ltd.

(57) ABSTRACT

A method for communication includes posting, by a software process, a set of buffers in a memory of a host processor and creating in the memory a list of labels associated respectively with the buffers. The software process pushes a first part of the list to a network interface controller (NIC), while retaining a second part of the list in the memory under control of the software process. Upon receiving a message containing a label, sent over a network, the NIC compares the label to the labels in the first part of the list and, upon finding a match to the label, writes data conveyed by the message to a buffer in the memory. Upon a failure to find the match in the first part of the list, the NIC passes the message from the NIC to the software process for handling using the second part of the list.

18 Claims, 4 Drawing Sheets

(52) U.S. Cl.
CPC ...... *H04L 67/1093* (2013.01); *H04L 67/1097* (2013.01); *H04L 69/06* (2013.01)

(56) References Cited

U.S. PATENT DOCUMENTS

| | | | |
|---|---|---|---|
| 8,249,072 B2 | 8/2012 | Sugumar et al. | |
| 8,909,727 B2* | 12/2014 | Frey .................... | H04L 49/9068 709/212 |
| 9,390,056 B1* | 7/2016 | Noureddine ........ | G06F 13/4022 |
| 2004/0049600 A1* | 3/2004 | Boyd .................... | G06F 12/145 709/250 |
| 2007/0291779 A1* | 12/2007 | Wunderlich ............ | H04L 49/90 370/411 |
| 2008/0028103 A1* | 1/2008 | Schlansker ............. | H04L 49/90 709/250 |
| 2009/0172301 A1* | 7/2009 | Ebersole ............... | G06F 13/385 711/154 |
| 2011/0173396 A1* | 7/2011 | Sugumar ............ | G06F 12/1081 711/137 |
| 2015/0281126 A1* | 10/2015 | Regula .................... | H04L 67/26 709/212 |

OTHER PUBLICATIONS

PCI Express® Base Specification, Revision 3.0, 860 pages, Nov. 10, 2010.

* cited by examiner

HYBRID TAG MATCHING

CROSS-REFERENCE TO RELATED APPLICATIONS

This application claims the benefit of U.S. Provisional Patent Application 62/045,606, filed Sep. 4, 2014, which is incorporated herein by reference.

FIELD OF THE INVENTION

The present invention relates generally to network communications, and particularly to methods and systems for efficient implementation of network protocols.

BACKGROUND

Message Passing Interface (MPI) is a communication protocol that is widely used for exchange of messages among processes in high-performance computing (HPC) systems. Messages sent from a sending process to a destination process are marked with an identifying label, referred to as a tag. Destination processes post buffers in local memory that are similarly marked with tags. When a message is received by the receiver (i.e., the host computer on which the destination process is running), the message is stored in a buffer whose tag matches the message tag. The process of finding a buffer with a matching tag for the received packet is called tag matching.

There are two protocols that are generally used to send messages over MPI: The "Eager Protocol" is best suited to small messages that are simply sent to the destination process and received in an appropriate matching buffer. The "Rendezvous Protocol" is better suited to large messages. In Rendezvous, when the sender process has a large message to send, it first sends a small message to the destination process announcing its intention to send the large message. This small message is referred to as an RTS (ready to send) message. The RTS includes the message tag and buffer address in the sender. The destination process matches the RTS to a posted receive buffer, or posts such a buffer if one does not already exist. Once a matching receive buffer has been posted at the destination process side, the receiver initiates a remote direct memory access (RDMA) read request to read the data from the buffer address listed by the sender in the RTS message.

U.S. Pat. No. 8,249,072 describes an interface device for a compute node in a computer cluster, which performs MPI header matching using parallel matching units. The interface device comprises a memory, which stores posted receive queues and unexpected queues. The posted receive queues store receive requests from a process executing on the compute node. The unexpected queues store headers of send requests (e.g., from other compute nodes) that do not have a matching receive request in the posted receive queues. The interface device also comprises a plurality of hardware pipelined matcher units. The matcher units perform header matching to determine if a header in the send request matches any headers in any of the plurality of posted receive queues.

SUMMARY

Embodiments of the present invention that are described hereinbelow provide apparatus and methods in which label matching operations are offloaded from a software process to a hardware device.

There is therefore provided, in accordance with an embodiment of the invention, a method for communication, which includes establishing a connection, in accordance with a predefined data exchange protocol, via a network between a software process running on a host processor at a first node of the network and a peer process running on a second node of the network. The software process posts a set of buffers in a memory of the host processor and creates in the memory a list of labels associated respectively with the buffers in accordance with the protocol. A first part of the list is pushed to a network interface controller (NIC) that connects the host processor to the network, while retaining a second part of the list in the memory under control of the software process.

Upon receiving in the NIC a message, containing a label, sent over the network by the peer process in accordance with the protocol, the NIC compares the label to the labels in the first part of the list. Upon finding a match to the label, the NIC writes data conveyed by the message to a buffer in the memory that is associated with the label and submits a notification to the software process. Upon a failure to find the match in the first part of the list, the NIC passes the message to the software process for handling. The software process compares the label to the labels in the second part of the list, and upon finding a match to the label, writes the data to the buffer in the memory that is associated with the label.

In the disclose embodiments, pushing the first part of the list includes submitting a head of the list to the NIC, and comparing the label in the NIC includes searching the labels in the head of the list. In some cases, submitting the head of the list includes, after the NIC has consumed one or more of the labels, pushing at least one further label from the list to the NIC.

In some embodiments, the method includes, when the NIC finds the match to the label in the first part of the list, submitting a completion report from the NIC to the software process to indicate that the label has been consumed, and updating the list of the labels posted by the software process in response to the completion report. Writing the data can include, after finding the match in the NIC, performing an RDMA operation by the NIC in order to retrieve the data from the second node, and after writing the retrieved data to the buffer, submitting a further completion report from the NIC to the software process to indicate that the data are available in the buffer.

Typically, establishing the connection includes communicating, in accordance with the data exchange protocol, between the software process running at the first node and a plurality of peer processes running on other nodes of the network, and posting the set of buffers and the list of labels includes sharing the buffers and the labels among the plurality of the peer processes. In a disclosed embodiment, comparing the label in the NIC includes maintaining on the NIC a shared receive queue, for data packets received over the network from any of the plurality of the peer processes, and using the labels in the first part of the list to match to the data packets in the shared receive queue.

In the disclosed embodiments, the data exchange protocol includes a Message Passing Interface (MPI) protocol, and the labels associated with the buffers and contained in the received message include MPI tags. Typically, receiving the message includes receiving a ready-to-send (RTS) message from the peer process in accordance with a Rendezvous protocol, and writing the data from the NIC includes issuing, in response to the RTS message, an RDMA read request from the NIC to the second node, and writing the data to the buffer upon receiving an RDMA read response containing the data from the second node.

There is also provided, in accordance with an embodiment of the invention, communication apparatus, including a memory, a host processor, which is coupled to the memory and is configured to run a software process, and a network interface controller (NIC), which connects the host processor to a network. The software process is configured to establish a connection, in accordance with a predefined data exchange protocol, via the network with a peer process running on a remote node of the network, and to post a set of buffers in the memory and create in the memory a list of labels associated respectively with the buffers in accordance with the protocol, and to push a first part of the list to the NIC, while retaining a second part of the list in the memory under control of the software process. The NIC is configured to receive a message, containing a label, sent over the network by the peer process in accordance with the protocol and to compare the label to the labels in the first part of the list and, upon finding a match to the label, to write data conveyed by the message to a buffer in the memory that is associated with the label and to submit a notification to the software process, and upon a failure to find the match in the first part of the list, to pass the message to the software process for handling. The software process is configured, upon receiving the message passed by the NIC, to compare the label to the labels in the second part of the list, and upon finding a match to the label, to write the data to the buffer in the memory that is associated with the label.

The present invention will be more fully understood from the following detailed description of the embodiments thereof, taken together with the drawings in which:

DETAILED DESCRIPTION OF EMBODIMENTS

Figure 1:
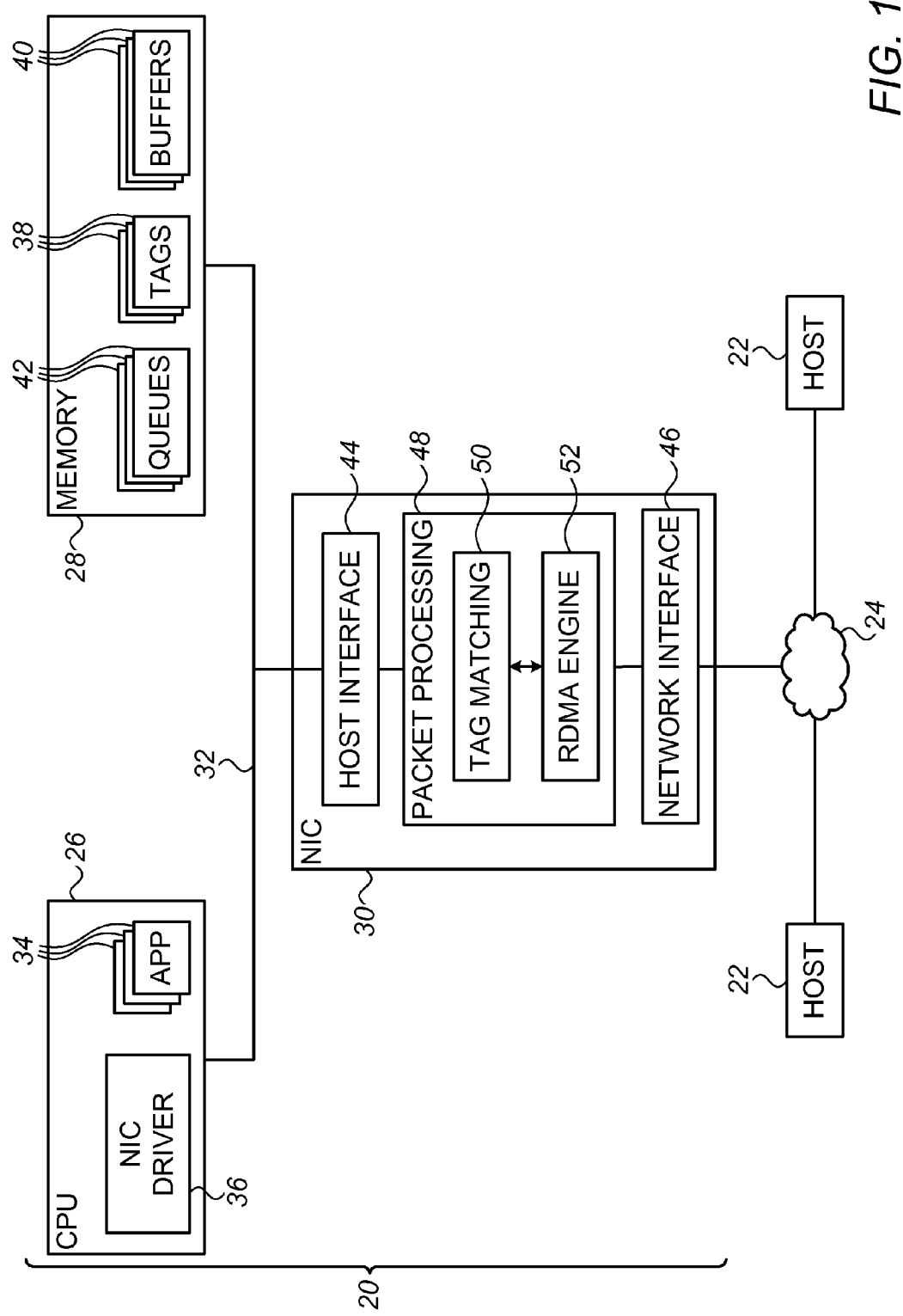
FIG. 1 is block diagram that schematically illustrates a computer system, in accordance with an embodiment of the invention.

MPI tag matching, when performed in software by a host processor, can consume substantial host resources, thus detracting from the performance of the actual software applications that are using MPI for communications. One possible solution is to offload the entire tag matching process to a peripheral hardware device, such as a network interface controller (NIC). In this case, the software application using MPI will post a set of buffers in a memory of the host processor and will pass the entire list of tags associated with the buffers to the NIC. In large-scale networks, however, the NIC may be required to simultaneously support many communicating processes and contexts (referred to in MPI parlance as "ranks" and "communicators," respectively). NIC access to and matching of the large lists of tags involved in such a scenario can itself become a bottleneck. The NIC must also be able to handle "unexpected" traffic, for which buffers and tags have not yet been posted, which may also degrade performance.

Embodiments of the present invention that are described herein address the need for efficient, balanced offload of label matching and buffer handling functions from software processes to a NIC, by sharing these functions flexibly between the NIC and software processes making use of the offload capabilities of the NIC. The disclosed embodiments thus offer the advantage of greater scalability to large networks and enabling the software to choose, in each situation, an optimal balance between hardware offload and software processing. When the NIC fails to find a matching label for a given message, it simply passes the message on for software handling by the host processor, thus providing graceful fallback with minimal degradation of performance.

The embodiments described below relate specifically to features of the MPI protocols, in which the buffer labels are referred to as "tags," as explained above. The principles of the present invention, however, are also applicable to other sorts of protocols for inter-process communications that use labeled buffers for data exchange. For example, in an alternative embodiment, partial offload of label matching functions can be applied in key-value data storage systems (as are commonly used in cloud storage), in which a buffer containing a value is accessed through a key, which serves as the label.

In the disclosed embodiments, a software process running on a host processor at a node of a network establishes connections via the network, in accordance with a predefined data exchange protocol, such as MPI, with one or more peer processes running on other nodes. To support these connections, as explained above, the software process posts a set of buffers in the memory of the host processor and creates a list of labels in the memory that are associated respectively with the buffers. The labels have the form dictated by the applicable protocol, such as MPI tags.

The software process pushes a part of the list, such as a number of labels at the head of the list, to the NIC that connects the host processor to the network, while retaining the remainder of the list in the memory under its own control. Typically, as the NIC matches and thus consumes the labels, the software process pushes further labels from the list to the NIC. The software process is able to decide how many labels to push to the NIC at any stage, possibly in conjunction with NIC driver software. The decision may be based, for example, on the rate of arrival of messages requiring label matching and the overall load of label matching that the NIC is required to perform for all of the processes currently running on the host processor.

When the NIC receives a message over the network from one of the peer processes, and the message contains a label in accordance with the protocol, the NIC compares the label to the labels in the part of the list that was pushed to the NIC. Upon finding a match to the label, the NIC writes data conveyed in the message to the buffer in the memory that is associated with this label and submits a notification to the software process. The notification serves two purposes: both to indicate to the software process that the label has been consumed, so that the process will update the list of the labels posted to the NIC; and to inform the software process that the data are available in the buffer. In some cases (such as when the NIC retrieves the data from the remote node by RDMA), the NIC may submit two notifications, in the form of completion reports, of which the first informs the software process of the consumption of the label and the second announces availability of the data.

On the other hand, upon failing to find a match among the labels in the part of the list that it possesses, the NIC will pass the message to the software process for handling. The software process will then compare the message label to the labels in the remainder of the list, and upon finding a match, will write the data to the appropriate buffer in the memory that is associated with the label.

FIG. 1 is block diagram that schematically illustrates a computer system 10, comprising multiple host computers 20, 22 deployed as nodes on a network 24, in accordance with an embodiment of the invention. (Host computers 20 and 22 are also referred to simply as "hosts.") Only the elements of computer 20 are shown in detail, but computers can operate in like fashion. Network 24 typically comprises a high-speed packet switching fabric, such as an Ethernet or InfiniBand network.

Computer 20 comprises a host processor (CPU) 26 and a host memory 28, which are coupled by a peripheral component bus, such as a PCI Express® bus, to a network interface controller (NIC) 30, which connects computer 20 to network 24. CPU 26 runs, inter alia, multiple application programs, including distributed applications, which give rise to processes 34 that run on CPU 26 in conjunction with peer processes on other nodes, such as computers 22. In the present embodiment, it is assumed that at least some of these processes communicate using MPI. A NIC driver 36 running on CPU 26 facilitates offload of MPI functions to NIC 30, as described below.

To exchange data using MPI, an application process 34 posts buffers 40 in memory 28, i.e., it requests and reserves ranges of addresses in the memory. Process 34 also creates in memory 28 a list of tags 38 associated respectively with buffers 40. In MPI, each such buffer is identified by its "communicator" (i.e., the context, shared by the processes on hosts 20, 22 belonging to this communication group), its "source rank" (identifying the process that has posted the buffer), and the tag number carried by the corresponding tag 38. A message received by NIC 30 from network 24 is considered to match a given buffer 40 only if all of these identifying parameters match the corresponding parameters in the message, and the process of matching the parameters is known as tag matching.

Application processes 34 running on computer 20 communicate over network 24 by submitting work requests to NIC 30. In response to these work requests, NIC driver 36 posts work items, commonly referred to as work queue elements (WQEs), in queues 42 in memory 28. NIC 30 reads and executes the WQEs from queues 42 and thus carries out the operations requested by processes 34. Upon completion of a work request, NIC 30 posts a completion report, referred to as a completion queue element (CQE), to a completion queue in memory 28, which is then read by the appropriate application process. In an embodiment of the present invention, certain of these work queues and completion queues are used by processes 34 and NIC 30 in support of the MPI offload functions of the NIC. These implementation features are described further hereinbelow with reference to FIGS. 4 and 5.

NIC 30 comprises a host interface 44, which connects the NIC to bus 32, and a network interface 46, having one or more ports for connection to network 24. Packet processing circuitry 48 in NIC 30 receives and processes incoming packets from network 46 and accordingly writes data from the packets to appropriate addresses (such as buffers 40) in memory 28. Circuitry 48 also generates and transmits outgoing packets to network 24 in response to work requests from processes 34, in accordance with the dictates of applicable communication protocols. For these purposes, circuitry 48 communicates directly with memory 28 by direct memory access (DMA) via host interface 44. These general functions of circuitry 48 are well known in the art, and further discussion of these functions is omitted here for the sake of brevity.

For purposes of offloading MPI-related functions from CPU 26 (and similarly, functions relating to other label-based messaging protocols), packet processing circuitry 48 comprises tag matching logic 50. Logic 50 processes incoming packets containing MPI tags and submits the results to processes 34 via memory 28. For this purpose, processes 34 push a part of their lists of tags 38 to tag matching logic 50, which uses these lists in tag matching operations, as described further hereinbelow. In the case of Rendezvous messages, tag matching logic 50 invokes an RDMA engine 52 in NIC 30 to retrieve data sent by peer processes running on host computers 22 to processes 34.

Typically, NIC 30 comprises an integrated circuit chip or chip set, with hard-wired or programmable logic circuits that are configured to perform the functions described herein. Alternatively, at least some of these functions may be performed under control of software or firmware by a programmable processor embedded in NIC 30.

Figure 2:
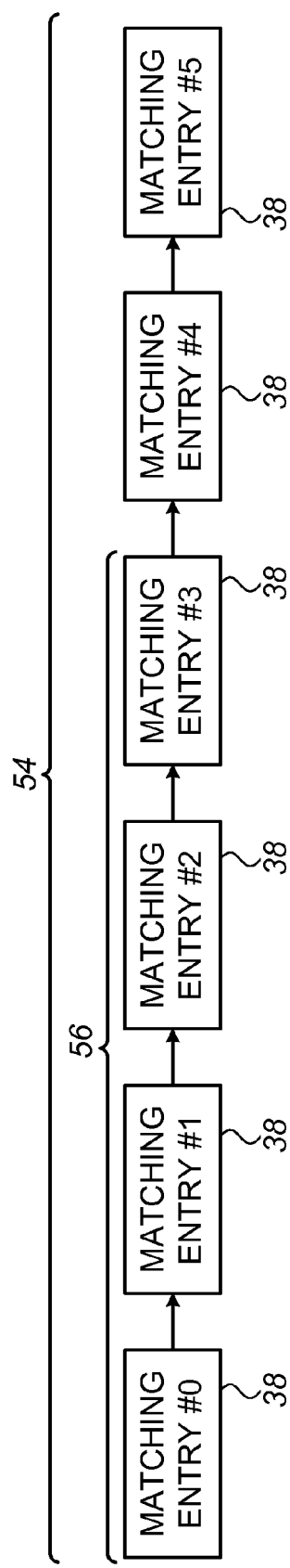
FIG. 2 is a block diagram that schematically shows a list of tags, in accordance with an embodiment of the invention.

FIG. 2 is a block diagram that schematically shows a list 54 of tags 38, in accordance with an embodiment of the invention. List 54 is posted and maintained by one of application processes 34, and similar lists are typically posted and maintained by other processes on computer 20 that use MPI. As the tags are consumed, process 34 posts new buffers 40 and adds corresponding tags 38.

Process 34 pushes a head 56 of list 54 to tag matching logic 50 in NIC 30. The tags in head 56 of list 54 may be held in a cache memory in NIC 30 for rapid access, or alternatively, tag matching logic 50 may access the tags in memory 28 using pointers provided by the application process. Process 34 decides on the number of tags to include in head 56 and may modify this number in the course of operation. As tag matching logic 50 consumes the tags it informs process 34, for example by posting CQEs, as noted above, thus enabling process 34 to track NIC actions and update list 54 accordingly. Process 34 removes the consumed tags from its list and pushes further tags to NIC 30 as needed.

Figure 3:
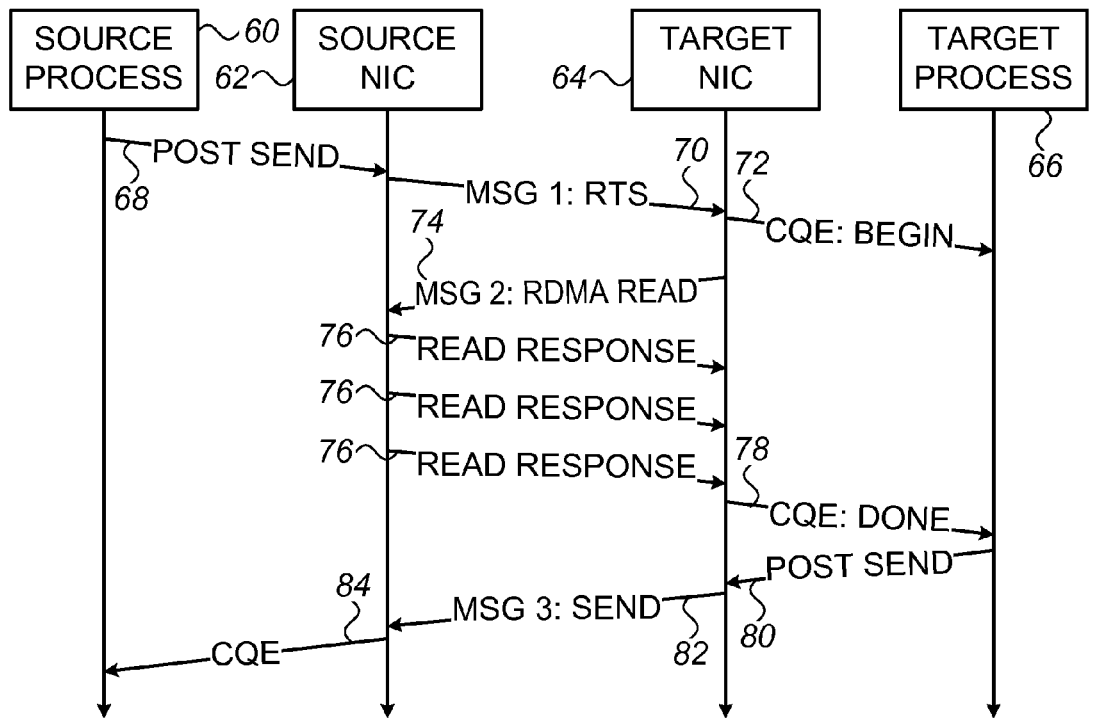
FIG. 3 is a communication flow diagram that schematically illustrates a method for tag-based data exchange, in accordance with an embodiment of the invention.

FIG. 3 is a communication flow diagram that schematically illustrates a method for tag-based data exchange, in accordance with an embodiment of the invention. The flow in this example refers to an MPI Rendezvous exchange between a source process 60, running on one of computers 22, and a target process 66, such as one of application processes 34 on computer 20. The exchange is based on transmission and reception of packets containing MPI tags by a source NIC 62, which serves source process 60, and a target NIC 64, such as NIC 30, which serves target process 66.

To initiate the Rendezvous exchange, source process 60 posts data for transfer to computer 20 in a buffer in memory of computer 22, and posts a request 68 to source NIC 62 to transmit an RTS message to target process 66. Request 68 typically takes the form of a send WQE, which indicates tag parameters for use in the exchange. In response to request 68, source NIC 62 sends an RTS packet 70 containing the appropriate tag parameters over network 24 to target NIC 64. Tag matching logic 50 in the target NIC matches the tag in the RTS packet against tags 38 in head 56 of the list posted by target process 66. In the example shown in FIG. 3, logic 50 finds a match, and submits a CQE 72 to target process 66 to indicate that the corresponding tag has been consumed and the Rendezvous exchange begun.

To retrieve the data indicated by RTS packet 70, target NIC 64 sends an RDMA read request packet 74 over network 24 to source NIC 62. The RDMA read request refers to the address range of the buffer in the memory of computer 22 that was indicated in RTS packet 70. In response to read request packet 74, source NIC 62 transmits one or more read response packets 76, containing the requested data, to target NIC 64. As shown in FIG. 3, the RDMA read request and response are carried out by NICs 62 and 64 without concurrently involving source and target processes 60, 66. Target NIC 64 writes the data from packets 76 to a buffer 40 in memory 28 that is indicated by the tag 38 that was matched previously, and then submits a second CQE 78 to target process 66 to indicate that the exchange has been completed and the data are available in the buffer.

After verifying receipt of the data, target process posts a request 80 to target NIC 64 to send an acknowledgment message back to source process 60. Request indicates the tag parameters that were initially indicated in request 68 and RTS packet 70. Target NIC 64 incorporates the tag in an acknowledgment packet 82 that it sends over network 24 to source NIC 62. Upon receiving this packet, the source NIC submits a CQE 84 (again, with the original tag parameters) to source process 60, to indicate that the data exchange has been completed.

Although the data exchange shown in FIG. 3 uses the Rendezvous protocol, Eager messages can be exchanged in a similar fashion. In this case, request 68, indicating the appropriate tag, will cause source NIC 62 to send an Eager message packet, containing the tag and data. Upon receiving this packet and successfully matching the tag, target NIC 64 will immediately write the data to the appropriate buffer 40 in memory 28, rather than invoking an RDMA message exchange. CQEs 72 and 78, signaling consumption of a tag and writing of the data to memory 28 may still be sent separately, or alternatively, the two completion reports may be coalesced into a single CQE in this case. Acknowledgment packet 82 will then be sent as described above.

Figure 4:
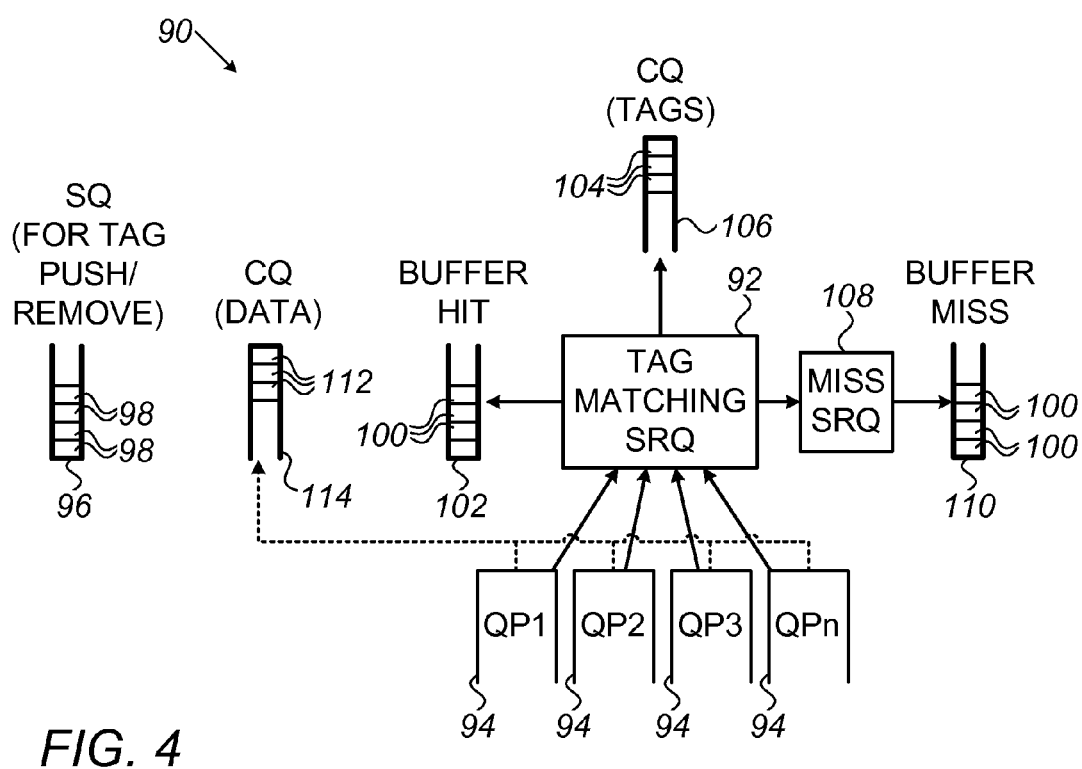
FIG. 4 is a block diagram that schematically illustrates data structures used in tag-based data exchange, in accordance with an embodiment of the invention.

FIG. 4 is a block diagram that schematically illustrates data structures 90 that are used in tag-based data exchange, in accordance with an embodiment of the invention. This set of data structures is used in interaction between NIC 30 and a particular software process running on CPU 26 of computer 20, such as one of application processes 34, that uses MPI to communicate with peer processes on other nodes of network 24. Data structures 90 are typically maintained in memory 28, and a similar set of data structures is maintained for each process on computer 20 that uses MPI. This particular arrangement of data structures is shown as one example implementation of the principles of tag matching offload that are described herein. Alternative implementations will be apparent to those skilled in the art and are considered to be within the scope of the present invention.

NIC 30 typically maintains a separate queue pair (QP) 94 for each peer process with which the local software process 34 on computer 20 is in communication. For purposes of tag matching, however, NIC 30 and the local process maintain a single shared receive queue (SRQ) 92, which is shared among QPs 94 and the peer processes that they represent. The use of SRQ 92 for this purpose enables NIC 30 to apply a single set of buffers 40 and list 54 of tags 38 in matching tags of incoming data packets on any of the peer processes. In order to push tags 38 onto head 56 of list 54 for use on SRQ 92, process 34 submits work requests, which cause driver 36 to post special-purpose WQEs 98 in a dedicated send queue (SQ) 96 in memory 28. Process 34 may also use SQ 96 to inform NIC 30 of the removal of tags from list 54.

Tag matching logic 50 in NIC 30 attempts to match the tags contained by incoming packets on SRQ 92 to tags 38 in head 56 of tag list 54. The tags point to WQEs 100 in a hit buffer queue 102, which indicate the locations of buffers 40 in memory 28 to which NIC 30 should write incoming data when it finds a match to a given tag. Upon finding a matching tag, logic 50 also writes a tag CQE 104 to a completion queue 106, to indicate that the tag has been consumed, as explained above. After incoming data have been written to the appropriate buffer 40 in memory 28 in a Rendezvous data exchange, NIC 30 writes a data CQE 112 to another completion queue 114.

QPs 94 share another SRQ 108 for tag matching misses, i.e., incoming packets in which tag matching logic 50 failed to find a matching tag in head 56 of list 54. SRQ 108 points to WQEs 100 in a miss buffer queue 110, which in turn point to buffers in memory 28 that are allocated for packets for which logic 50 was unable to find a matching tag. In this case, too, NIC 30 writes a CQE to memory 28, possibly in the same completion queue 114 as is used by tag matching SRQ 92, to notify process 34 that software tag matching will be required.

Figure 5:
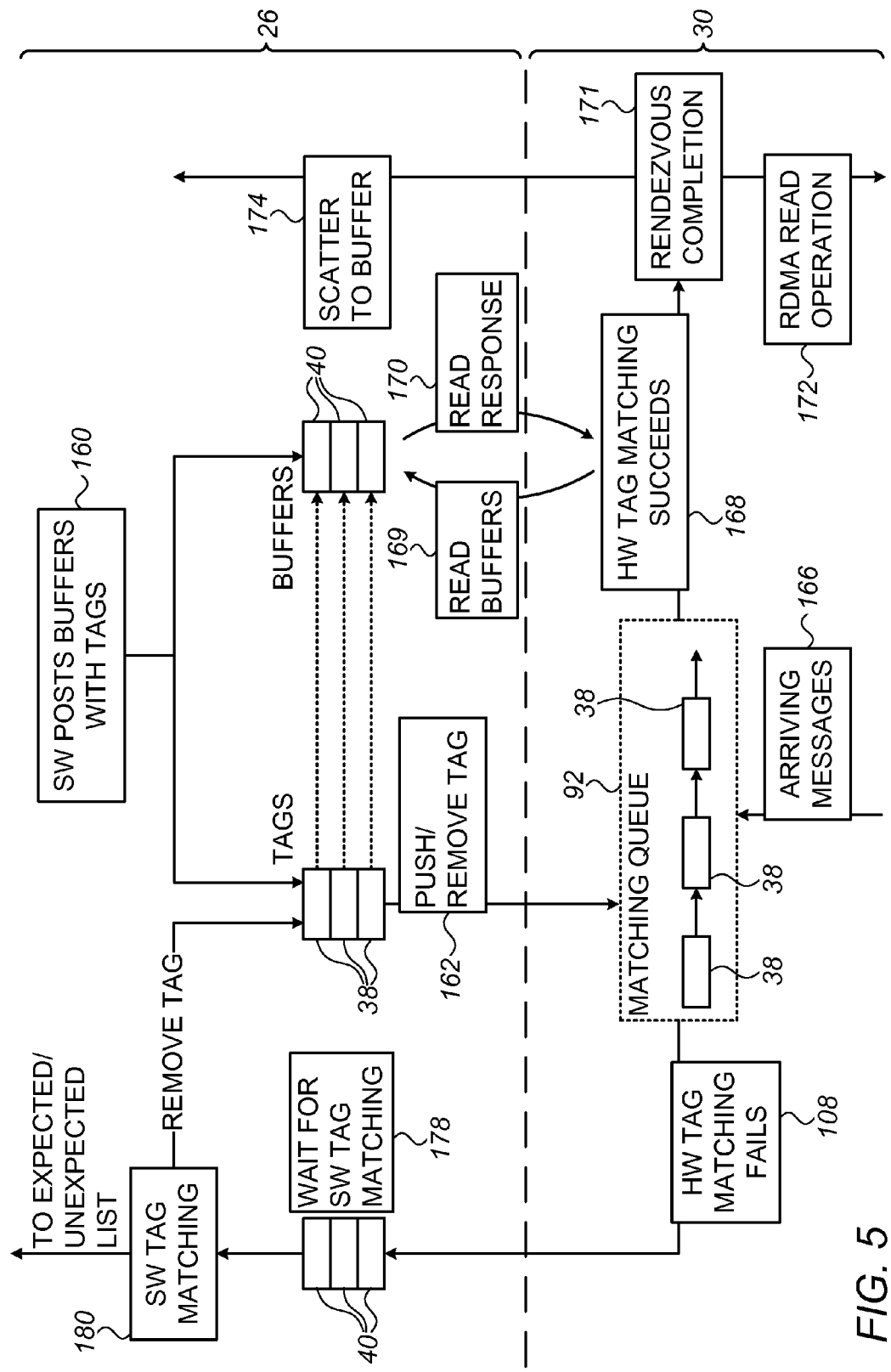
FIG. 5 is a block diagram that schematically illustrates functional components of a computer system that are used in tag-based data exchange, in accordance with an embodiment of the invention.

FIG. 5 is a block diagram that schematically illustrates functional components of computer 20 that are used in tag-based data exchange, in accordance with an embodiment of the invention. The operations performed by hardware in NIC 30 are shown below the dashed line in the figure, while those performed by software running on CPU 26 are shown above the dashed line. Most of the functions performed by the components in FIG. 5 were already described above, but they are shown and described briefly here, as well, for the sake of completeness.

A software process, such as one of processes 34, posts buffers 40 and corresponding tags 38 in memory 28, at a buffer posting procedure 160. The software process pushes tags 38 at head 56 of tag list 54 to tag matching SRQ 92, in a tag pushing procedure 162. The software may remove tags from list 54, as well.

Upon arrival of a message 166 from network 24 and passage of the message to the front of tag matching SRQ 92, tag matching logic 50 attempts to match the tag in the packet to one of tags 38 in head 56 of list 54. When hardware tag matching succeeds 168, logic 50 invokes a DMA read operation 169 via bus 32 to read buffer 40, and receives a response 170 indicating the location or locations in memory 28 to which the incoming data are to be scattered. (In the implementation illustrated in FIG. 4, this information is provided by WQEs 100 in hit buffer queue 102, which is maintained in memory 28. Alternatively, if these WQEs are cached in NIC 30, read operation 169 and response 170 may not be required at this stage.) NIC 30 then proceeds to complete a Rendezvous exchange 171 by initiating an RDMA read operation 172, as illustrated above in FIG. 3. Once NIC 30 receives the RDMA read response, it scatters the received data to the proper buffer 40, in a scattering procedure 174. The entire process of tag matching and data exchange can be performed by NIC 30 autonomously, without interrupting CPU 26.

When no matching tag is found in in SRQ 92, the incoming packet is handled by miss SRQ 108, which places the packet in a buffer associated with a software matching queue 178. Software tag matching 180 attempts to match the tag in the packet to one of tags 38 on the part of list 54 that was not passed to NIC 30. When the software process finds a matching tag, it places the packet data in the appropriate buffer for further processing and removes the tag that has been consumed from tag list 54. When the software finds no matching tag, it treats the tag of the incoming data packet as an unexpected tag, in order to buffer and handle the packet appropriately. NIC 30 may issue an interrupt to alert CPU 26 when software tag matching and/or tag generation is needed, but such interrupts may be moderated while the process in question is busy with other tasks. Thus, the tag handling mechanisms described above are useful in reducing the burden of interrupts on CPU 26.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
    establishing a connection, in accordance with a predefined data exchange protocol, via a network between a software process running on a host processor at a first node of the network and a peer process running on a second node of the network;
    posting, by the software process, a set of buffers in a memory of the host processor and creating in the memory a list of labels associated respectively with the buffers in accordance with the protocol;
    pushing a first part of the list to a network interface controller (NIC) that connects the host processor to the network, while retaining a second part of the list in the memory under control of the software process;
    receiving in the NIC a message, containing a label, sent over the network by the peer process in accordance with the protocol;
    comparing the label, in the NIC, to the labels in the first part of the list and, upon finding a match to the label, writing data conveyed by the message from the NIC to a buffer in the memory that is associated with the label and submitting a notification to the software process;
    upon a failure to find the match in the first part of the list, passing the message from the NIC to the software process for handling; and
    comparing the label, by the software process, to the labels in the second part of the list, and upon finding a match to the label, writing the data to the buffer in the memory that is associated with the label.

2. The method according to claim 1, wherein pushing the first part of the list comprises submitting a head of the list to the NIC, and wherein comparing the label in the NIC comprises searching the labels in the head of the list.

3. The method according to claim 2, wherein submitting the head of the list comprises, after the NIC has consumed one or more of the labels, pushing at least one further label from the list to the NIC.

4. The method according to claim 1, and comprising, when the NIC finds the match to the label in the first part of the list, submitting a completion report from the NIC to the software process to indicate that the label has been consumed, and updating the list of the labels posted by the software process in response to the completion report.

5. The method according to claim 4, wherein writing the data comprises, after finding the match in the NIC, performing an remote direct memory access (RDMA) operation by the NIC in order to retrieve the data from the second node, and after writing the retrieved data to the buffer, submitting a further completion report from the NIC to the software process to indicate that the data are available in the buffer.

6. The method according to claim 1, wherein establishing the connection comprises communicating, in accordance with the data exchange protocol, between the software process running at the first node and a plurality of peer processes running on other nodes of the network, and
    wherein posting the set of buffers and the list of labels comprises sharing the buffers and the labels among the plurality of the peer processes.

7. The method according to claim 6, wherein comparing the label in the NIC comprises maintaining on the NIC a shared receive queue, for data packets received over the network from any of the plurality of the peer processes, and using the labels in the first part of the list to match to the data packets in the shared receive queue.

8. The method according to claim 1, wherein the data exchange protocol comprises a Message Passing Interface (MPI) protocol, and wherein the labels associated with the buffers and contained in the received message comprise MPI tags.

9. The method according to claim 8, wherein receiving the message comprises receiving a ready-to-send (RTS) message from the peer process in accordance with a Rendezvous protocol, and wherein writing the data from the NIC comprises issuing, in response to the RTS message, an remote direct memory access (RDMA) read request from the NIC to the second node, and writing the data to the buffer upon receiving an RDMA read response containing the data from the second node.

10. Communication apparatus, comprising:
    a memory;
    a host processor, which is coupled to the memory and is configured to run a software process; and
    a network interface controller (NIC), which connects the host processor to a network,
    wherein the software process is configured to establish a connection, in accordance with a predefined data exchange protocol, via the network with a peer process running on a remote node of the network, and to post a set of buffers in the memory and create in the memory a list of labels associated respectively with the buffers in accordance with the protocol, and to push a first part of the list to the NIC, while retaining a second part of the list in the memory under control of the software process, and
    wherein the NIC is configured to receive a message, containing a label, sent over the network by the peer process in accordance with the protocol and to compare the label to the labels in the first part of the list and, upon finding a match to the label, to write data conveyed by the message to a buffer in the memory that is associated with the label and to submit a notification to the software process, and upon a failure to find the match in the first part of the list, to pass the message to the software process for handling, and
    wherein the software process is configured, upon receiving the message passed by the NIC, to compare the label to the labels in the second part of the list, and upon finding a match to the label, to write the data to the buffer in the memory that is associated with the label.

11. The apparatus according to claim 10, wherein the first part of the list that is pushed to the NIC comprises a head of the list, and wherein the NIC is configured to search for the match in the head of the list.

12. The apparatus according to claim 11, wherein the software process is configured to push at least one further label from the list to the NIC after the NIC has consumed one or more of the labels.

13. The apparatus according to claim 10, wherein the NIC is configured, upon finding the match to the label in the first part of the list, to submit a completion report to the software process to indicate that the label has been consumed, and to update the list of the labels posted by the software process in response to the completion report.

14. The apparatus according to claim 13, wherein the NIC is configured, after finding the match, to perform an RDMA operation in order to retrieve the data from the remote node, and after writing the retrieved data to the buffer, to submit a further completion report to the software process to indicate that the data are available in the buffer.

15. The apparatus according to claim 10, wherein the software process is configured, in accordance with the data exchange protocol, to communicate with a plurality of peer processes running on other nodes of the network, and
wherein the buffers and the labels posted by the software process are shared among the plurality of the peer processes.

16. The apparatus according to claim 15, wherein the NIC is configured to maintain a shared receive queue for data packets received over the network from any of the plurality of the peer processes, and to use the labels in the first part of the list to match to the data packets in the shared receive queue.

17. The apparatus according to claim 10, wherein the data exchange protocol comprises a Message Passing Interface (MPI) protocol, and wherein the labels associated with the buffers and contained in the received message comprise MPI tags.

18. The apparatus according to claim 17, wherein the message received from the peer process comprises a ready-to-send (RTS) message in accordance with a Rendezvous protocol, and wherein the NIC is configured to issue, in response to the RTS message, an remote direct memory access (RDMA) read request to the second node, and to write the data to the buffer upon receiving an RDMA read response containing the data from the second node.

* * * * *